(No Model.)
H. BINGHAM.
BICYCLE TIRE.
No. 575,586. Patented Jan. 19, 1897.
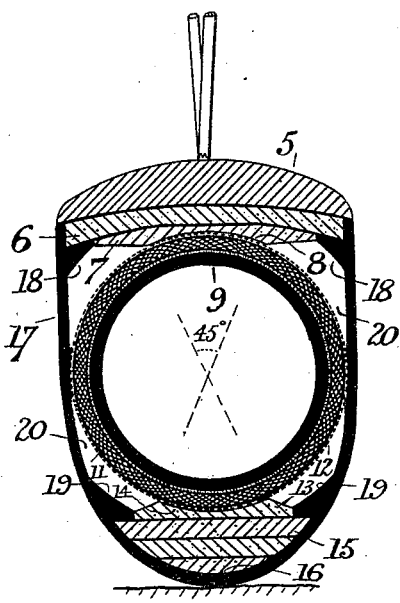
Fig 1
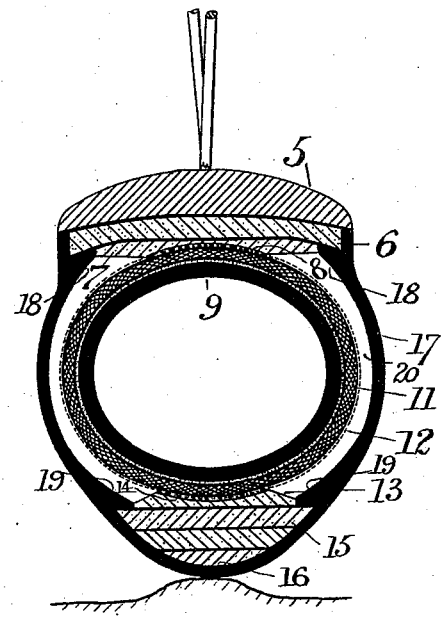
Fig 3
Fig 2
Fig 4
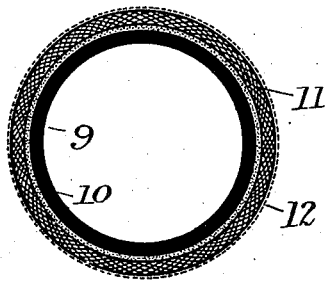
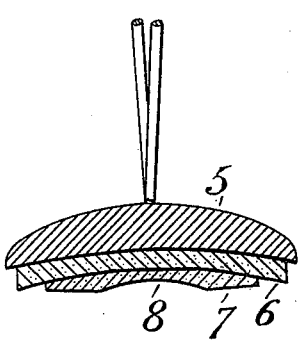
Witnesses:
John C. Wilson.
Percy C. Bowen.
Inventor:
Henry Bingham

UNITED STATES PATENT OFFICE.

HENRY BINGHAM, OF MELBOURNE, VICTORIA.

BICYCLE-TIRE.

SPECIFICATION forming part of Letters Patent No. 575,586, dated January 19, 1897.

Application filed August 6, 1896. Serial No. 601,915. (No model.)

*To all whom it may concern:*

Be it known that I, HENRY BINGHAM, dentist, a subject of the Queen of the United Kingdom of Great Britain and Ireland, and a resident of Melbourne, in the Colony of Victoria, have invented certain new and useful Improvements in Bicycle and Like Tires, of which the following is a specification.

It is the aim of this invention to provide tires for rims of bicycle and other wheels which shall possess not only the leading advantages of the ordinary pneumatic tires, but also other advantages which the latter do not possess. To attain this object, several parts of and incidental to the ordinary pneumatic tires as now generally used are dispensed with, and thereby weight, expense, and time are saved and frequent inconvenience is avoided.

It has been proved by experiment that the tire to which this invention relates is exceedingly durable, is practically non-puncturable, and is light, and, further, is resilient and well adapted for the attainment of the highest speed.

In using this invention no inflater need be carried, as the tire has no inflating-valve and no detachable collapsible inner tube. The cover is not put under strong tension and is not secured to recesses in the wood or metal rim by internal pressure. It is a fixture for its ordinary lifetime and may be stripped off to be replaced by a new one when worn out.

The accompanying drawings illustrate this invention, like reference-characters denoting like parts in all the figures.

Figure 1 represents a cross-section through a wheel rim and tire at the point where the tire rests upon the ground. Figs. 2 and 4 are cross-sections showing details in the construction of this invention; and Fig. 3 shows the same parts as in Fig. 1, but in the position assumed when an obstruction in the road or a heavy weight in the saddle causes the tire to yield.

Referring to the construction, 5 shows the wheel rim or felly, which may be of any suitable material and contour, its function being simply to act as a support for the foundation hereinafter set forth. Any usual method of connecting the spokes of the felly may be used which allows the spokes to be renewed when required without removing any part of the tire, no particular kind of connection forming any part of this invention.

All round the rim 5 there is permanently united to it by cement a slightly elastic foundation 6 7, having a raised central portion, in which is a concave arc 8. Only slight elasticity is required, and it is found satisfactory to use as the substance of this foundation a layer of cork 6 and one of celluloid 7, the cork being united to the celluloid and being made waterproof by india-rubber solution or a like cement.

The tire-tube consists of a tube 9 of thick india-rubber, which is covered exteriorly with a coating 10 of elastic cementing material—ordinarily india-rubber solution—and is drawn into another tube, 11, composed of a flexible and inextensible material, woven silk, cotton, or other textile fabric being suitable. These two tubes are permanently united together under suitable pressure, the inner tube being permanently expanded to a slight extent, the consequent pressure on its exterior coating 10 forcing part of such coating into the substance of the outer tube 11, closing the pores of the latter, the remainder of said coating on solidifying causing a perfect union of the tubes. The exterior of the outer tube 11 is luted or closed against the passage of air by a flexible covering.

A covering consisting of several layers of gelatin, applied in the form of a hot solution, or a covering of a gelatin layer underneath and a gutta-percha layer above it, applied in the form of hot solution, has been found to be suitable. There is thus formed a single compound tube 9 12, impermeable to air, yet flexible, care having been taken that the india-rubber part of the tubing is thick enough to cause the tube to readily resume its normal shape whenever distortion has occurred and the cause of distortion has been removed or passed.

In practice the compound tube 9 12 is taken in a length sufficient for a tire, and after the temporary closing of one end within a vise or otherwise the other end is attached to an air or gas pump, by which is forced into the tube enough air or gas to give a high pressure, which in practice is somewhat (and may be much) higher than the highest pressure ordinarily used in pneumatic tires. The ends of the length of tubing are then united together to form a circular tube, methods of so doing being well known to those versed in the art of making tires. It is not, however, essential to inflate the tube under the said high pressure prior to making the tube endless or circular, as the latter step might be taken first and the inflation be done through a small aperture, which could then be permanently closed.

The inflated flexible compound tube 9 12 (now forming a circle) is then sprung onto the foundation aforesaid, slightly compressing the same, and is cemented firmly to the concavity 8 therein. When the said tube is in place, it will remain a perfectly tight fixture upon its foundation, the arc of contact being purposely made very small, say forty to forty-five degrees, or even less. Around the outer edge of the tube 9 12 is then laid a concavo-convex puncture-shield, which is cemented on and is composed of a slightly-elastic material, several layers of cork 15, and a layer of celluloid 13, all in combination, being indicated in the drawings, the cork being waterproofed by rubber cement. This shield has a concavity 14 and a convexity 16, both exactly central. The arc of the concavity is specially restricted, so as to extend over an angle of forty to forty-five degrees or less, for reasons hereinafter stated. The thickness of the shield 13 15 will vary according to the class of track or road intended to be traveled on. An outer flexible cover 17, of india-rubber or rubber and canvas or the like, is provided, having two internally-projecting lips 18, one near each edge, where it is to be connected to the foundation, and also two other internally-projecting lips 19, one to fit against each side of the puncture-shield.

There is a separate recess specially provided in the foundation and in the puncture-shield, as illustrated in the drawings, for each one of these internally-projecting lips to abut against or fit into. The cover, with its lips, is cemented onto the foundation and the puncture-shield 13 15 and need never be removed until worn out. The cover incloses, but is not attached in any way to, the compound tube; and while, when there is no weight on the saddle, or only a slight weight, it may touch that tube, as it does in Fig. 1, with any considerable pressure, it will not touch at all owing to its flexibility at each side where it is uncemented. The four lips on the cover extend all round the same—that is, circularly—the cover being molded during manufacture into a normal circular form. This cover when separate cannot lie flat, as many ordinary covers do, but will always tend to form a circle. The said lips serve also the important purpose of keeping the cover firmly in correct adjustment and prevent the lateral movements of the uncemented parts of said cover from loosening the parts which are cemented down. There are at all times spaces 20 between the cover 17 and the compound tube 9 12, and these spaces contain air which is not under pressure.

In using this invention, while the lowest part of the tread of the tire where it presses the ground will remain virtually the same in cross-section whether the tire travels over a smooth or a bumpy track, yet owing to the convexity of said tread and to the freedom of the compound tube 9 12 to yield to pressure, combined with the smallness of the arcs 8 and 14 (of the foundation and puncture-shield, respectively) which contact with the tube, (the said smallness rendering a comparatively small pressure operative,) the tire will respond readily to shocks and concussions by becoming flattened or oval at the part about the said tread, as indicated in Fig. 3, the comfort of the rider being thereby maintained. The arcs of contact 8 and 14 are made small in order that the resiliency of the compound tube shall be preserved, it being unattached to any other part as far as possible.

Having now particularly described and ascertained the nature of my said invention and in what manner the same is to be performed, I declare that what I claim is—

1. In a bicycle or other like tire, the circular cover 17 having the circular lips 18 and 19, in combination with the foundation 6 7 and the puncture-shield 13 15, said foundation and puncture-shield each having recesses with which said lips engage all substantially as described and for the purposes set forth.

2. In a wheel-tire, the combination with the rim, of a foundation-piece composed of flattened layers of different kinds of elastic material around the periphery of the rim, an elastic cover attached to said rim and having inwardly-projecting lips engaging said layers of elastic material; inwardly-projecting lips on the inside of said cover near the tread portion thereof, said lips made integral with said cover, a puncture-shield composed of flattened layers of different kinds of elastic material held inside of said cover between the tread portion thereof and the said lips, a circular canvas casing held between the elastic material carried by the rim and the said puncture-shield, and an endless inflated tube carried within said casing, substantially as described.

3. In a wheel-tire the combination with the rim, of a layer of cork around the periphery of said rim, a layer of celluloid on top of the cork, a waterproof cement uniting the two, a rubber cover attached to the rim and having inwardly-projecting lips engaging the said cork and celluloid, inwardly-projecting lips on the inside of said cover near the tread portion thereof, a puncture-shield composed of a plurality of layers of cork and celluloid held within said cover between said lips and the tread portion of said cover, a circular endless casing-tube held between the celluloid and cork carried by the wheel-rim, and the puncture-shield carried next to the tread-surface of the outer covering, and an inflated rubber tube inside of said casing cemented to the latter, substantially as described.

In witness whereof I have hereunto set my hand in the presence of two subscribing witnesses.

HENRY BINGHAM.

Witnesses:
G. G. TURRI,
E. F. NICHOLLS.